Oct. 10, 1961  C. H. SUMNER ET AL  3,003,598
BRAKE DRUM
Filed April 7, 1958  2 Sheets-Sheet 2

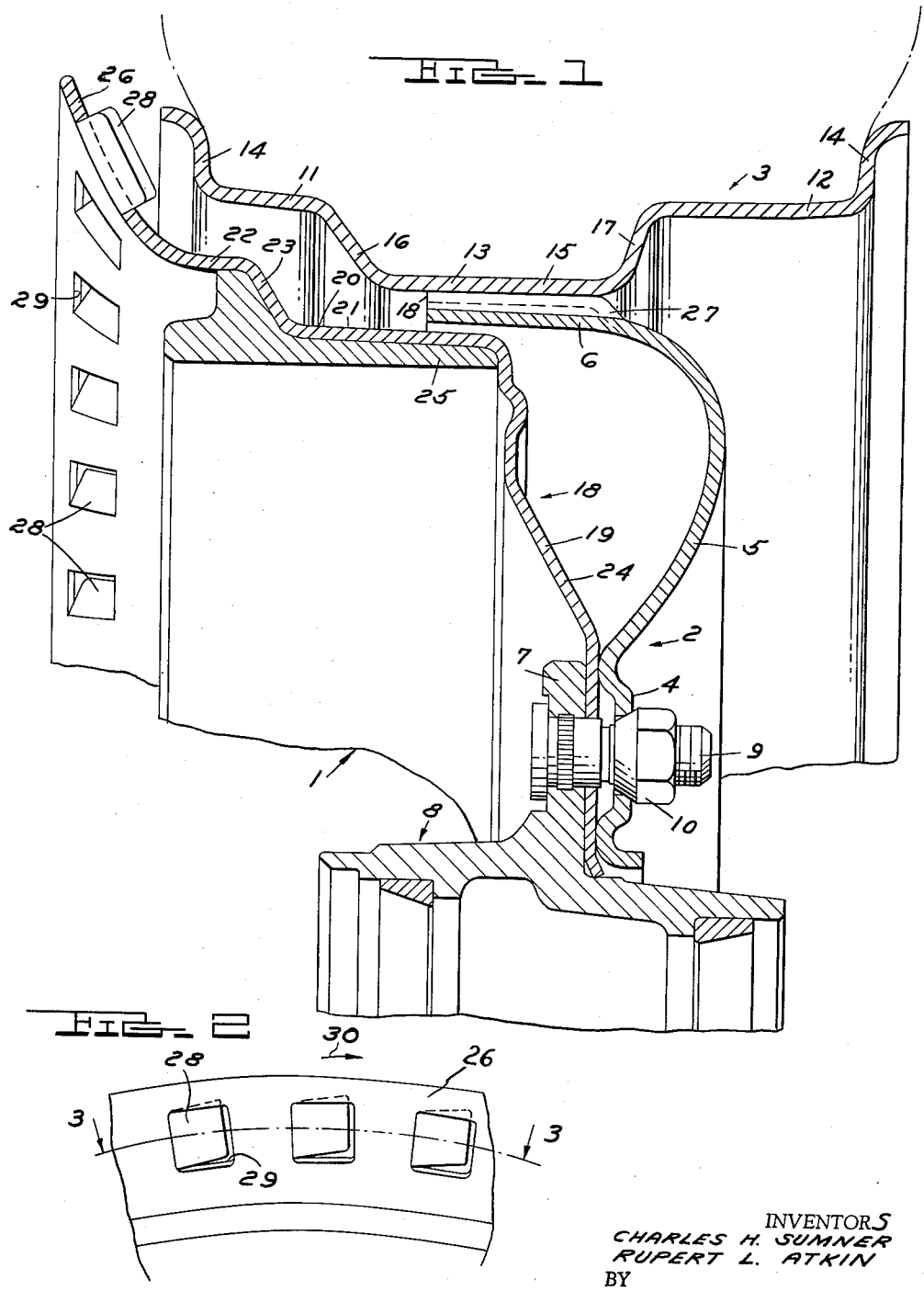

INVENTORS
CHARLES H. SUMNER
RUPERT L. ATKIN
BY
Whittemore, Hulbert & Belknap
ATTORNEYS

United States Patent Office 3,003,598
Patented Oct. 10, 1961

3,003,598
BRAKE DRUM
Charles H. Sumner, Detroit, and Rupert L. Atkin, Grosse Pointe Woods, Mich., assignors to Kelsey-Hayes Company, Detroit, Mich., a corporation of Delaware
Filed Apr. 7, 1958, Ser. No. 726,750
6 Claims. (Cl. 188—218)

This invention relates to brake drums and refers more particularly to cooling means for brake drums.

The invention has for one of its objects to provide a brake drum having an annular flange provided with an extension for dissipating heat and also acting as an air scoop for creating a flow of air over the flange.

The invention has for a further object to provide a brake drum having a metal shell formed with an annular flange and a brake liner within and secured to the flange, the flange having an integral extension for dissipating heat and acting as an air scoop.

The invention has for still another object to provide baffle means on the flange extension to increase the flow of air and create turbulence.

These and other objects of the invention will become apparent from the following description taken in connection with the accompanying drawings in which:

FIGURE 1 is a radial section of a wheel structure embodying the invention.

FIGURE 2 is a fragmentary elevation looking from the left in FIG. 1.

Figure 3:
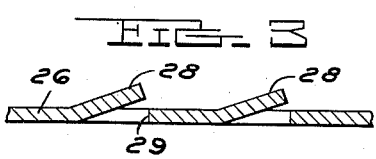
FIGURE 3 is a section taken on the line 3—3 of FIG. 2.

Referring to FIGURES 1-3, the wheel 1 has a wheel body 2 and a tire carrying rim 3. The wheel body is a wheel disk having the mounting or bolting-on portion 4, the web portion 5 and the peripheral flange 6. The mounting or bolting-on portion 4 is detachably secured to the fixed radial flange 7 of the wheel hub 8 by suitable means, such as the bolts 9 and nuts 10.

The rim 3 is of the type having an annular well and has the axially spaced annular tire bead seats 11 and 12, the annular well 13 between and integral with the bead seats, and the annular tire retaining flanges 14 integral with and at the edges of the bead seats spaced from the well. The bead seats flare outwardly in opposite direction from the well which has the base 15 and the side walls 16 and 17. The peripheral flange 6 is formed with circumferentially spaced enlargements 18 to which the base 15 of the well is secured by suitable means, such as rivets, not shown.

A composite brake drum 18 is at the inboard side of the wheel body. The drum comprises a shell 19 formed from a flat metal blank of steel or like material by a suitable drawing operation, and has an annular flange 20 radially inside the rim 3 in spaced relation thereto. The flange 20 is formed with a generally cylindrical portion 21 connected to an enlarged cylindrical portion 22 by a flared annular portion 23. The shell has an integral web or back 24 fixedly secured to the wheel hub 8 by the bolts 9 and nuts 10 between the radial flange 7 and bolting-on portion 4 of the wheel disk. An annular cast iron liner 25 is bonded to the inner surface of the flange 20 as by centrifugal casting.

The flange 20 is formed with an annular extension 26 which extends in an axially inboard direction and flares radially outwardly in a curve. The extension terminates axially inwardly beyond the inboard tire retaining flange 14. During the rotation of the wheel along the ground, the extension 26 acts as an air scoop directing air into the annular space between flange 20 and rim 3, the air circulating into the annular space between the web 24 of the brake drum shell and the web portion 5 of the wheel disk through the annular space between the cylindrical flange portion 21 of the shell and the peripheral flange 6 of the wheel disk. Air can also escape to the outboard side of the wheel disk through the spaces 27 between enlargements 18. The air circulating over the outer surface of the brake drum shell, and particularly over the flange 20 is effective to carry away heat generated by the engagement of a friction device (not shown) with the liner 25.

The extension 26 is formed with an annular series of integral equally spaced louvers 28 on its radially outer side. Each louver is formed by cutting along three sides and bending out the louver 28 in a radially outward direction to define an opening 29. All of the louvers 28 are inclined to the extension and open in the same direction circumferentially. Preferably the louvers open in the direction of intended rotation of the wheel, indicated by the arrow 30 in FIGURE 2. The louvers have a baffle effect, increasing the flow of air and creating air turbulence to increase the rate of heat dissipation. In addition, the extension and louvers provide the drum shell with added surface area in contact with the air, further promoting heat dissipation from the drum.

Figure 4:
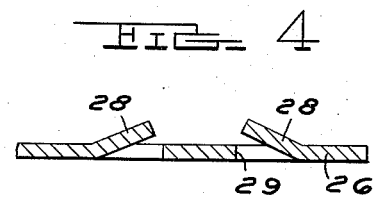
FIGURE 4 is similar to FIGURE 3, but shows a modification.

FIGURE 4 is a modification in which alternate louvers open in one direction circumferentially of the drum and the remaining louvers open in the opposite direction. All of the louvers are on the radially outer side of the extension, as in FIGURES 1-3. All of the louvers, individually and in cooperation with adjacent louvers, act upon the air entering between the extension 26 and rim to increase the flow and create turbulence. Otherwise, the FIGURE 4 construction is exactly like FIGURES 1-3.

Figure 5:
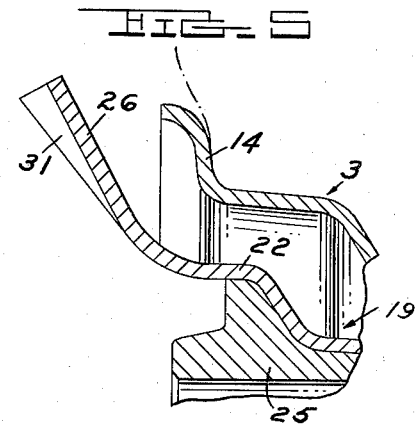
FIGURE 5 is a fragmentary section similar to a portion of FIGURE 1, but showing another modification taken on the line 5—5 of FIGURE 6.
Figure 6:
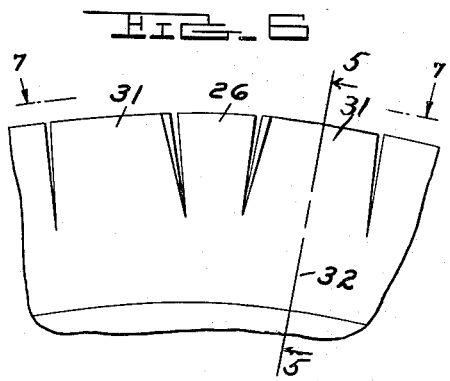
FIGURE 6 is a fragmentary elevation looking from the left in FIGURE 5.
Figure 7:
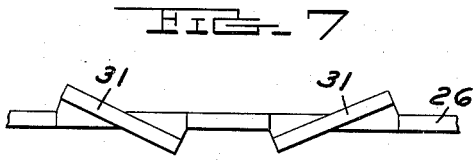
FIGURE 7 is an edge view of the structure of FIGURE 6, taken on the line 7—7 of FIGURE 6.

FIGURES 5-7 show another modification. The extension 26 is radially lanced or cut inwardly from its periphery at spaced points to provide an annular series of equally spaced vanes 31. The vanes are twisted about their median radial planes 32, alternate vanes twisted in one direction and the remaining vanes twisted in the opposite direction. The opposite edges of the vanes are displaced to opposite sides of the extension. All of the vanes, individually and in cooperation with adjacent vanes, act upon the air entering between the extension 26 and rim to increase the flow and create turbulence. Otherwise the construction of FIGURES 5-7 is like FIGS. 1-3.

Figure 8:
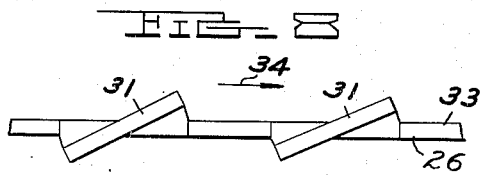
FIGURE 8 is similar to FIGURE 7, but shows a modification.

FIGURE 8 shows a modification which differs from FIGURES 5-7 only in that all of the vanes are twisted in the same direction, preferably with the vane portions at the radial outer side 33 of the extension opening in the direction of intended rotation, indicated by arrow 34. These vanes likewise increase air flow and create turbulence.

Figure 9:
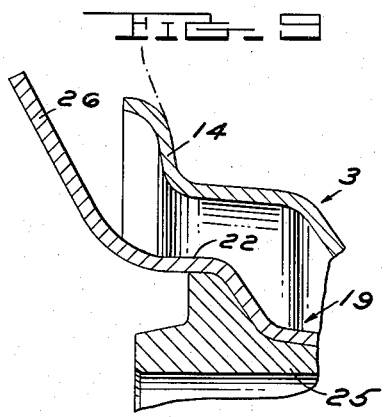
FIGURE 9 is similar to FIGURE 5, but shows another modification.

FIGURE 9 illustrates a modification which is exactly like the construction of FIGS. 1-3 except that the extension 26 does not have baffle means such as louvers or vanes, but instead is imperforate and has the configuration shown in section throughout its full circumferential extent.

What we claim as our invention is:

1. Wheel structure comprising a wheel body and a tire carrying rim mounted on and encircling said wheel body, a composite brake drum carried by said wheel structure, said brake drum comprising a one-piece metal shell having a web and a peripheral continuous annular flange radially inside said rim in spaced relation thereto, a brake liner within and secured to said flange, said flange having an integral annular extension extending axially inwardly of said rim and flaring radially outwardly to its periphery to dissipate heat and to provide an air scoop for flow of air into the annular space between said rim and flange while the wheel structure is rotating, the flaring portion of said extension being located axially inwardly of said rim in axially opposed relation thereto and cooperating therewith to provide an annular air inlet to said space, the flaring portion of said extension having an annular series of circumferentially spaced holes spaced radially inwardly from the periphery of said flaring portion, louvers for said respective holes, said louvers being struck from the material of the flaring portion of said extension, each louver having the same dimensions as the hole associated therewith and being integrally joined to said flaring portion along an edge of the associated hole which edge lies in a radial plane, said louvers extending circumferentially from said edges across the associated holes and into said air inlet at an acute angle to said flaring portion to form openings to said holes, to increase the flow of air into said space and to produce turbulence 2. Wheel structure as defined in claim 1 in which the diameter of said extension at its periphery is at least as great as the maximum diameter of said rim at its axially inner edge, and in which alternate louvers extend from said edges in the direction of rotation of the wheel structure and the remaining louvers extend from said edges in the opposite direction.

3. Wheel structure comprising a wheel body and a tire carrying rim mounted on and encircling said wheel body, a composite brake drum carried by said wheel structure, said brake drum comprising a one-piece metal shell having a web and a peripheral continuous annular flange radially inside said rim in spaced relation thereto, a brake liner within and secured to said flange, said flange having an integral annular extension extending axially inwardly of said rim and flaring radially outwardly to its periphery to dissipate heat and provide an air scoop for flow of air into the annular space between said rim and flange while the wheel structure is rotating, the flaring portion of said extension being located axially inwardly of said rim in axially opposed relation thereto and cooperating therewith to provide an annular air inlet to said space, said extension being radially lanced at circumferentially spaced points along its periphery to provide an annular series of circumferentially spaced vanes for increasing the flow of air and producing turbulence, each vane being twisted about its median radial plane to displace its edges to opposite sides of said extension.

4. Wheel structure as defined in claim 3 in which the diameter of said extension at its periphery is at least as great as the maximum diameter of said rim at its axially inner edge, and in which the leading edge of each vane projects into the air inlet and is inclined in the direction of rotation of the wheel structure.

5. Wheel structure as defined in claim 3 in which the diameter of said extension at its periphery is at least as great as the maximum diameter of said rim at its axially inner edge, and in which alternate vanes are twisted in one direction and the remaining vanes are twisted in the opposite direction.

6. Wheel structure as defined in claim 1 in which the diameter of said extension at its periphery is at least as great as the maximum diameter of said rim at its axially inner edge, and in which each of said louvers extend from said edges in the direction of rotation of the wheel structure.

References Cited in the file of this patent

UNITED STATES PATENTS

| | | |
|---|---|---|
| 1,665,437 | Booth | Apr. 10, 1928 |
| 2,265,938 | Eksergian | Dec. 9, 1941 |
| 2,563,769 | Wyant | Aug. 7, 1951 |
| 2,599,707 | Gandelot | June 10, 1952 |
| 2,754,942 | Lyon | July 17, 1956 |
| 2,847,096 | Lyon | Aug. 12, 1958 |
| 2,851,131 | Hibbard | Sept. 9, 1958 |
| 2,857,208 | Lyon | Oct. 21, 1958 |
| 2,896,749 | Gaylord | July 28, 1959 |

FOREIGN PATENTS

| | | |
|---|---|---|
| 518,980 | Canada | Nov. 29, 1955 |
| 1,011,437 | France | Apr. 2, 1952 |
| 469,803 | Great Britain | July 27, 1937 |
| 675,961 | Great Britain | July 16, 1952 |
| 771,174 | Great Britain | Mar. 27, 1957 |
| 148,936 | Switzerland | Oct. 16, 1931 |

OTHER REFERENCES

Publication: Design News (magazine), May 1, 1953, pages 66, 67 relied on.